Feb. 28, 1956
F. J. EHLERS
2,736,264
PRIME MOVERS
Filed Sept. 3, 1952
2 Sheets-Sheet 1
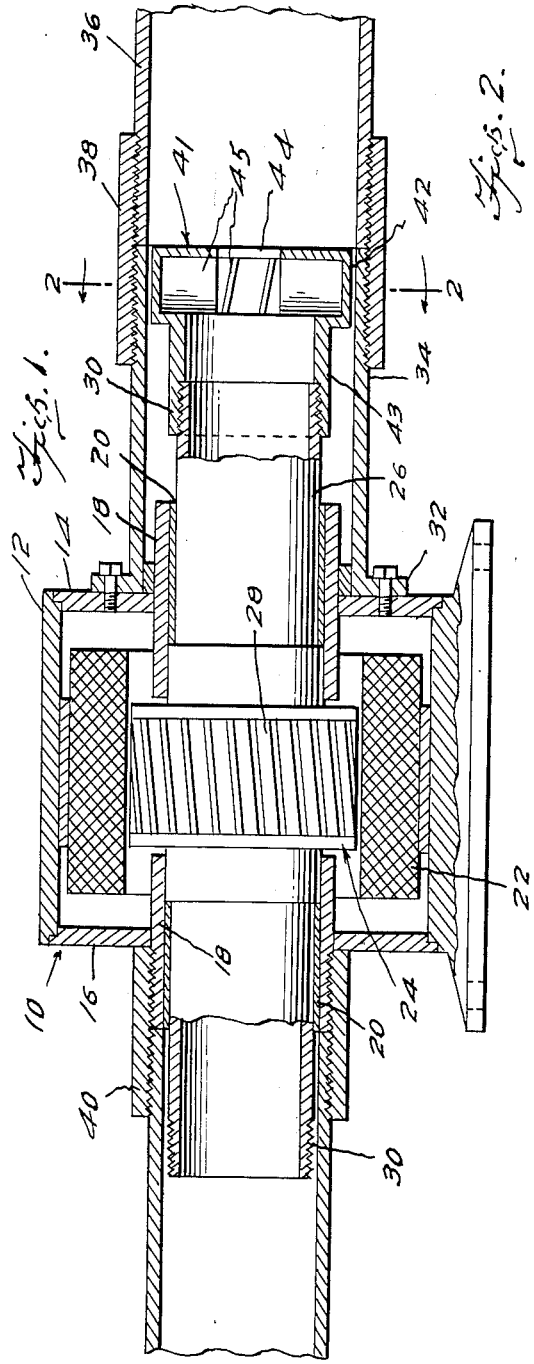
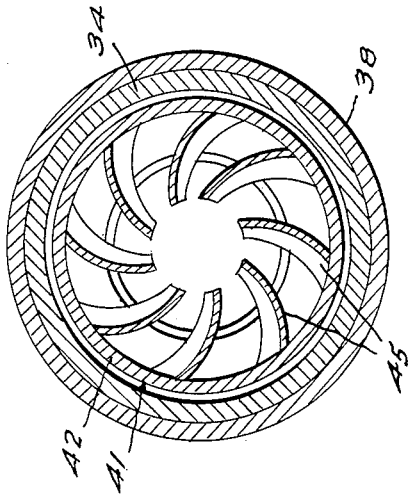
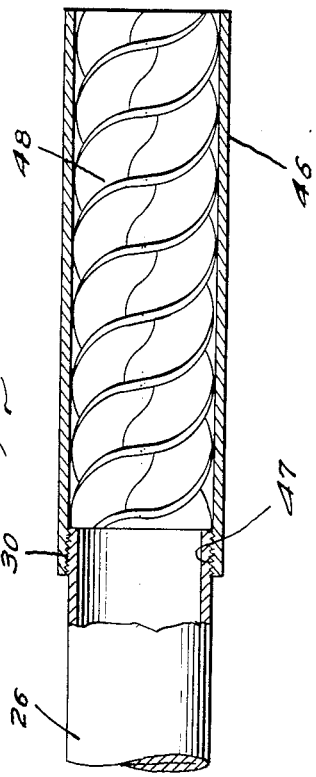
Inventor
Fred J. Ehlers
By Wilfred E. Lawson
ATTY.

Feb. 28, 1956 F. J. EHLERS 2,736,264
PRIME MOVERS
Filed Sept. 3, 1952 2 Sheets-Sheet 2
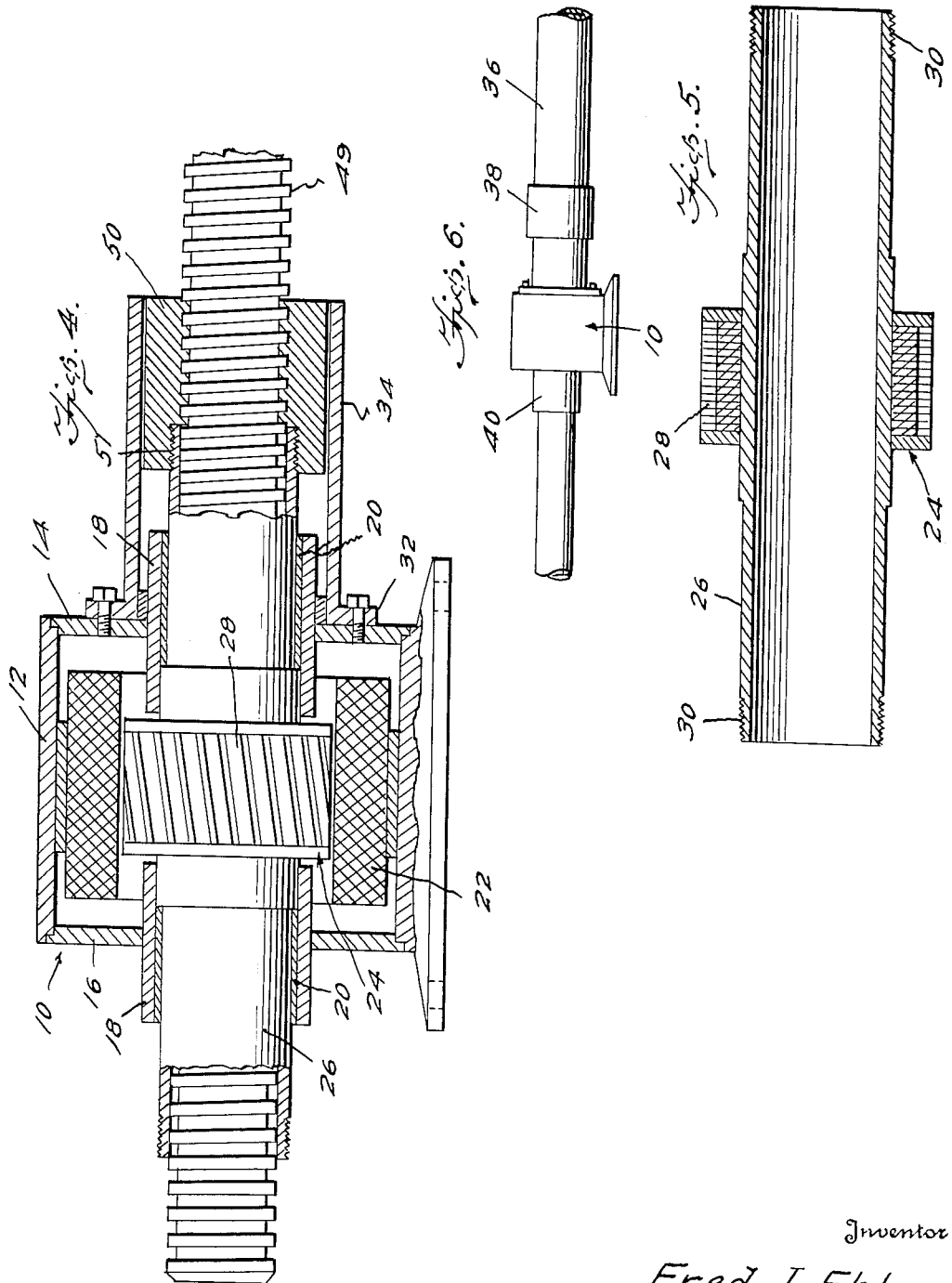
Inventor
Fred J. Ehlers
By Wilfred E. Lawson
ATTORNEY 2,736,264
Patented Feb. 28, 1956

2,736,264

PRIME MOVERS

Fred J. Ehlers, Lodi, Calif.

Application September 3, 1952, Serial No. 307,679

1 Claim. (Cl. 103—87)

This invention relates generally to improvements in prime movers.

A principal object of the present invention is to provide, in a manner as hereinafter pointed out, an improved electric motor structure wherein the armature shaft is of tubular construction, by means of which such motor may be used as an in-line pump in fluid transmission pipe lines or as a work performing machine in connection with the actuating of a thrust or pull element such as a screw shaft.

Another object of the invention is to provide a hollow or tubular shaft electric motor structure, wherein the housing or casing is constructed for connection in a pipe line with means for attaching a pumping head to an end of the tubular shaft, whereby the movement of fluid through the pipe line can be boosted or accelerated.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in longitudinal section of a motor constructed in accordance with the present invention, the armature and a portion of the armature shaft being in elevation, showing the motor connected in a pipe line and showing one end of the armature shaft with a rotary pump attached thereto.

Figure 2 is a transverse section taken substantially on the line 2—2 of Figure 1.

Figure 3 is a detail view of an alternative type of pump for attachment to the tubular armature shaft.

Figure 4 is a view corresponding to Figure 1 but showing a means of coupling a screw to the armature shaft to effect the axial movement of the screw through the shaft.

Figure 5 is a longitudinal sectional view through the armature and the tubular shaft per se.

Figure 6 is a diagrammatic view illustrating in side elevation the coupling of the motor in a pipe line.

Referring now more particularly to the drawings, the numeral 10 generally designates the housing or shell for the motor of the present invention, which shell comprises in addition to the circular wall 12, the opposite end walls 14 and 16.

Each of the walls 14 and 16 has extending therethrough a bearing sleeve 18, a portion of one end of each of which sleeves extends into the casing, while a portion of the opposite end extends outwardly a substantial distance beyond the end wall through which the sleeve projects. This sleeve may be provided with an ordinary type of bearing such as a bronze bearing or the like, or it may be provided with roller or ball bearings, not shown. A simple type of bearing such as a bronze bearing is here shown within each of the sleeves and designated 20.

Within the casing or housing are the usual field armature windings generally designated 22.

The numeral 24 generally designates the rotary armature unit.

The armature comprises the tubular shaft 26 around which is placed the armature winding or windings 28, of the usual form or construction and located substantially midway between the ends of the tubular shaft as shown.

The ends of the shaft 26 are externally screw threaded as indicated at 30 for the purpose hereinafter set forth.

As shown in Figure 1, the armature windings 28 are located centrally within the casing to rotate within the field windings 22 and the two opposite ends of the tubular shaft 26 extend through the aligned bearing or bearing sleeves 18 to project at each end a substantial distance beyond the end walls of the casing.

One end wall of the casing, here shown as the wall 14, has secured thereto, by means of a flange 32, an end of a coupling nipple 34, by means of which connection may be made with an end of a pipe line by means of a coupling union, as illustrated in Figures 1 and 6, where the pipe line is designated 36 and the coupling union is designated 38.

The last mentioned figures also show the opposite end or side of the motor casing connected with the pipe line by a corresponding union 40 which is threadably coupled with the extended end of the bearing sleeve 18 which extends from the end wall 16 of the motor casing.

The motor when connected in a fluid pipe line in the manner illustrated, may be employed as a booster pump for moving fluid through the pipe by threading onto one end of the tubular or hollow shaft a rotary pump unit which is generally designated 41. Such pump unit comprises the housing head 42 which upon one side has the tubular hub 43 which is threaded on the end of the hollow shaft as shown and through which the liquid or fluid in the pipe line passes, while at the opposite side of the head 42 of the rotary pump a central suction inlet 44 is formed. Within the head are conventional blades 45 which effect the drawing in of the liquid into the head and the propulsion of the liquid through the hollow head.

In Figure 6, a diagrammatic illustration is made of the manner in which the hollow or tubular shaft motor is set into a pipe line in conjunction with a rotary pump to function as a booster, causing the fluid in the pipe line to pass axially through the tubular shaft of the motor armature.

In place of the form of the pump shown in Figures 1 and 2 and generally designated 41, use may be made of a screw type pump such as is shown in Figure 3 wherein the numeral 46 designates an elongate tubular casing which is internally threaded at one end as indicated at 47 for threaded engagement on the end of the armature shaft 26. Within and extending through the major portion of the tubular casing 46 is a screw 48 which has an overall diameter equal to the internal diameter of the casing and which is fixed to the casing so that the casing and screw turn as a unit with the tubular shaft 26 to effect the movement of material through the shaft when the end of the screw casing is introduced into such material.

Figure 4 illustrates another application of the invention whereby a pulling or thrusting force may be exerted by means of a jack screw 49. As illustrated the screw 49 is of an overall diameter to pass entirely through the tubular shaft 26 and there is threaded onto the screw a heavy nut 50 which at one end is counterbored and threaded as indicated at 51 to receive and make a fixed connection with a threaded end of the shaft 26 of the armature. With this construction it will be readily seen that when the motor is fixed against movement the nut 50 will be rotated with the tubular shaft 26 around the screw and will move the screw to apply a thrusting force or will move it in the opposite direction to apply a pulling force to any object which is connected to the outer end of the screw.

From the foregoing description it will be readily apparent that there is provided by the present invention a motor structure which is adapted to many uses in addition to the specific ones herein disclosed. It will also be apparent that the motor herein set forth can be connected in a fluid line to effect the movement of fluid through such line without exposing any of the current carrying elements of the motor to contact with the fluid so that the use of packings or other means for maintaining tight connections to prevent fluid from getting into the motor, is eliminated.

I claim:

In an electric motor structure, a casing having two opposite walls, a pair of aligned sleeves extending through said walls, bearing elements in said sleeves, field magnet windings within the casing disposed in circular arrangement around the axial center of said bearing elements, a tubular armature shaft extending through said bearing elements and having its ends extending beyond the outer ends of said sleeves, an armature winding encircling and supported on said shaft within the circular area defined by the field windings, each end of said tubular shaft being screw threaded, a tubular coupling nipple secured to one of said walls and enclosing the adjacent ends of a sleeve and the shaft, said nipple being adapted for connection with an end of a pipe, a circular housing coupled to the said adjacent end of said shaft and opening into the bore thereof, said housing having an outer end wall provided with a centered opening of a lesser diameter than that of the shaft bore, and a fluid impeller unit mounted on said shaft within said housing, said housing having a diameter slightly less than that of the bore of said nipple.

References Cited in the file of this patent

UNITED STATES PATENTS

| | | |
|---|---|---|
| 1,363,315 | Dron | Dec. 28, 1920 |
| 1,539,195 | Kremser | May 26, 1925 |
| 2,037,735 | Oberhoffen | Apr. 21, 1936 |
| 2,485,408 | Pezzillo | Oct. 18, 1949 |
| 2,500,400 | Cogswell | Mar. 14, 1950 |
| 2,524,269 | Patterson | Oct. 3, 1950 |
| 2,535,695 | Pezzillo | Dec. 26, 1950 |